United States Patent
Chinomi (10) Patent No.: US 10,311,605 B2
(45) Date of Patent: Jun. 4, 2019

(54) ITERATIVE IMAGE RECONSTRUCTION METHOD, ITERATIVE IMAGE RECONSTRUCTION PROGRAM, AND TOMOGRAPHY APPARATUS

(71) Applicant: Shimadzu Corporation, Kyoto (JP)

(72) Inventor: Kenta Chinomi, Kizugawa (JP)

(73) Assignee: Shimadzu Corporation, Nakagyo-ku, Kyoto-shi, Kyoto (JP)

( * ) Notice: Subject to any disclaimer, the term of this patent is extended or adjusted under 35 U.S.C. 154(b) by 25 days.

(21) Appl. No.: 15/706,507

(22) Filed: Sep. 15, 2017

(65) Prior Publication Data

US 2018/0082446 A1 Mar. 22, 2018

(30) Foreign Application Priority Data

Sep. 21, 2016 (JP) ................. 2016-183744

(51) Int. Cl.
*G06T 11/00* (2006.01)

(52) U.S. Cl.
CPC .......... *G06T 11/006* (2013.01); *G06T 11/005* (2013.01); *G06T 11/008* (2013.01); *G06T 2210/41* (2013.01); *G06T 2211/421* (2013.01); *G06T 2211/424* (2013.01)

(58) Field of Classification Search
CPC .... G06T 11/003; G06T 11/005; G06T 11/006; G06T 11/008; G06T 2211/421; G06T 2211/424; A61B 6/5205; A61B 6/5258; A61B 6/5282

See application file for complete search history.

(56) References Cited

U.S. PATENT DOCUMENTS

| | | | |
|---|---|---|---|
| 8,958,660 B2 | 2/2015 | Pal et al. | G06T 11/003 |
| 2012/0128265 A1* | 5/2012 | Silver et al. | G06T 11/006 382/275 |
| 2018/0204355 A1* | 7/2018 | Mailhe et al. | G06T 11/003 |

FOREIGN PATENT DOCUMENTS

JP     2011-156302 A     8/2011     ............... A61B 6/03

OTHER PUBLICATIONS

C. Lemmens: Suppression of Metal Artifacts in CT Using a Reconstruction Procedure That Combines MAP and Projection Completion IEEE Transactions on Medical Imaging, vol. 28 Issue:2 (2009).
E. Tanaka: Subset-dependent relaxation in brock-iterative algorithms for image reconstruction in emission tomography, Phys Med Biol 48: 1405-1422 (2003).

* cited by examiner

*Primary Examiner* — Andrew W Johns
(74) *Attorney, Agent, or Firm* — Muir Patent Law, PLLC (57) ABSTRACT

Provided are an iterative image reconstruction method, an iterative image reconstruction program, and a tomography apparatus capable of effectively performing image reconstruction by shorting computation time when performing image reconstruction using an iterative method. In this iterative image reconstruction method, in cases where the image quality after image reconstruction is insufficient when the image was obtained with the number of iterations of 100 times in the first image reconstruction processing, when resuming the image reconstruction, the number of iterations and the state variables at the end of the reconstruction in which the number of iterations is 100 times are read, and then the image reconstruction is resumed.

6 Claims, 5 Drawing Sheets

ITERATIVE IMAGE RECONSTRUCTION METHOD, ITERATIVE IMAGE RECONSTRUCTION PROGRAM, AND TOMOGRAPHY APPARATUS

This Application claims priority under 35 U.S.C. § 119 to Japanese Patent Application No. 2016-183744 filed on Sep. 21, 2016, the entire contents of which are hereby incorporated by reference.

TECHNICAL FIELD

The present invention relates to an iterative image reconstruction method, an iterative image reconstruction program, and a tomography apparatus for reconstructing an image using an iterative method.

BACKGROUND ART

For example, when performing an image reconstruction in an X-ray CT (Computed Tomography) apparatus as a tomography apparatus, filtered backprojection (FBP: Filtered Back Projection) method has been conventionally used as a standard image reconstruction method. On the other hand, in recent years, research and practical realization of the image reconstruction using an iterative method is progressing due to, e.g., improved performance of computers. In the case of using an iterative method, to reduce artifacts due to various factors, it is possible to reflect complicated physical models, prior knowledge, etc., and therefore various methods have been proposed so far (see Patent Document 1, Patent Document 2, Non-Patent Document 1).

Such a method can be considered as an iterative method based on objective function maximization. In this method, a reconstructed image is obtained by maximizing the objective function F represented by the following Formula (1).

$$F(\mu,y)=D(\mu,y)+\beta R(\mu) \quad \text{Formula (1)}$$

Here, $\mu$ in the aforementioned Formula (1) is a reconstructed image vector, and y is projection data. D is called "data term" and the like, which indicates the degree of conformity with measurement data, and is defined by likelihood calculated from measured projection (actually measured projection data obtained by an X-ray detector) and estimated parameters (the image estimated by the aforementioned Formula (1)). Since $\mu$ and y are vectors, they are written in bold.

In addition, R is generally called "penalty term" or the like and reflects the validity of the estimated parameter (estimated image). In this specification, hereinafter, R will be referred to as "validity term" for the sake of convenience. Further, $\beta$ is a coefficient that controls the strength of the validity term R, which is determined empirically.

In the actual calculation in the aforementioned Formula (1), an optimization algorithm such as a steepest descent method and a Newton method is used. Further, in order to avoid falling into a local solution, a combinatorial optimization method such as a genetic algorithm and an annealing method may sometimes be incorporated. When a steepest descent method is used as an optimization algorithm, the update formula of the reconstructed image by the aforementioned objective function is represented by the following Formula (2).

Formula (2)
$$\mu^{n+1} = \mu^n + \alpha \times \nabla F(\mu, y) \qquad (式2)$$
$$= \mu^n + \alpha \times \nabla D(\mu, y) + \alpha \times \beta \times \nabla R(\mu)$$

$\alpha$ in Formula (2) is called a step size and has a role of controlling the magnitude of the update amount in the gradient direction. Further, $\nabla$ in Formula (2) is a gradient, which is a partial differential with respect to the estimation parameter (reconstructed image). The update formula in the $j^{th}$ pixel is represented by the following Formula (3).

$$\mu_j^{n+1} = \mu_j^n + \alpha \times \frac{\partial}{\partial \mu_j} D(\mu, y) + \alpha \times \beta \times \frac{\partial}{\partial \mu_j} R(\mu) \quad \text{Formula (3)}$$

In the aforementioned Formula (3), $\alpha$ and $\beta$ are assumed to not depend on the number of iterations and the pixel position, and R is assumed to not depend on the number of iterations. On the other hand, they may also be assumed to depend on the number of iterations and the pixel position. For example, the aforementioned Non-Patent Document 2 is directed to an image reconstruction method in which $\alpha$ depends on the number of iterations (indirectly also depends on the pixel value which is being reconstructed), and the aforementioned Patent Document 2 is directed to an image reconstruction method in which $\alpha$ and $\beta$ depend on the pixel position.

In this way, when $\alpha$, $\beta$, and R are assumed to depend on the number of iterations and the pixel position, the aforementioned Formula (3) may be represented by the following Formula (4).

$$\mu_j^{n+1} = \mu_j^n + \alpha_j^n \times \frac{\partial}{\partial \mu_j} D(\mu, y) + \alpha_j^n \times \beta_j^n \times \frac{\partial}{\partial \mu_j} R^n(\mu) \quad \text{Formula (4)}$$

Here $\alpha^n$, $\beta^n$, and $R^n$ are not direct estimation targets but are auxiliary variables for obtaining a reconstructed image, and are variables for deciding update conditions for obtaining the reconstructed image, which depend on the number of iterations or the pixel position. Such variables are called state variables in this specification. Such state variables may also be called update condition variables in this specification. Here, $R^n$ is a function in a strict sense, but in this specification, those including this will be called state variables.

Figure 5:
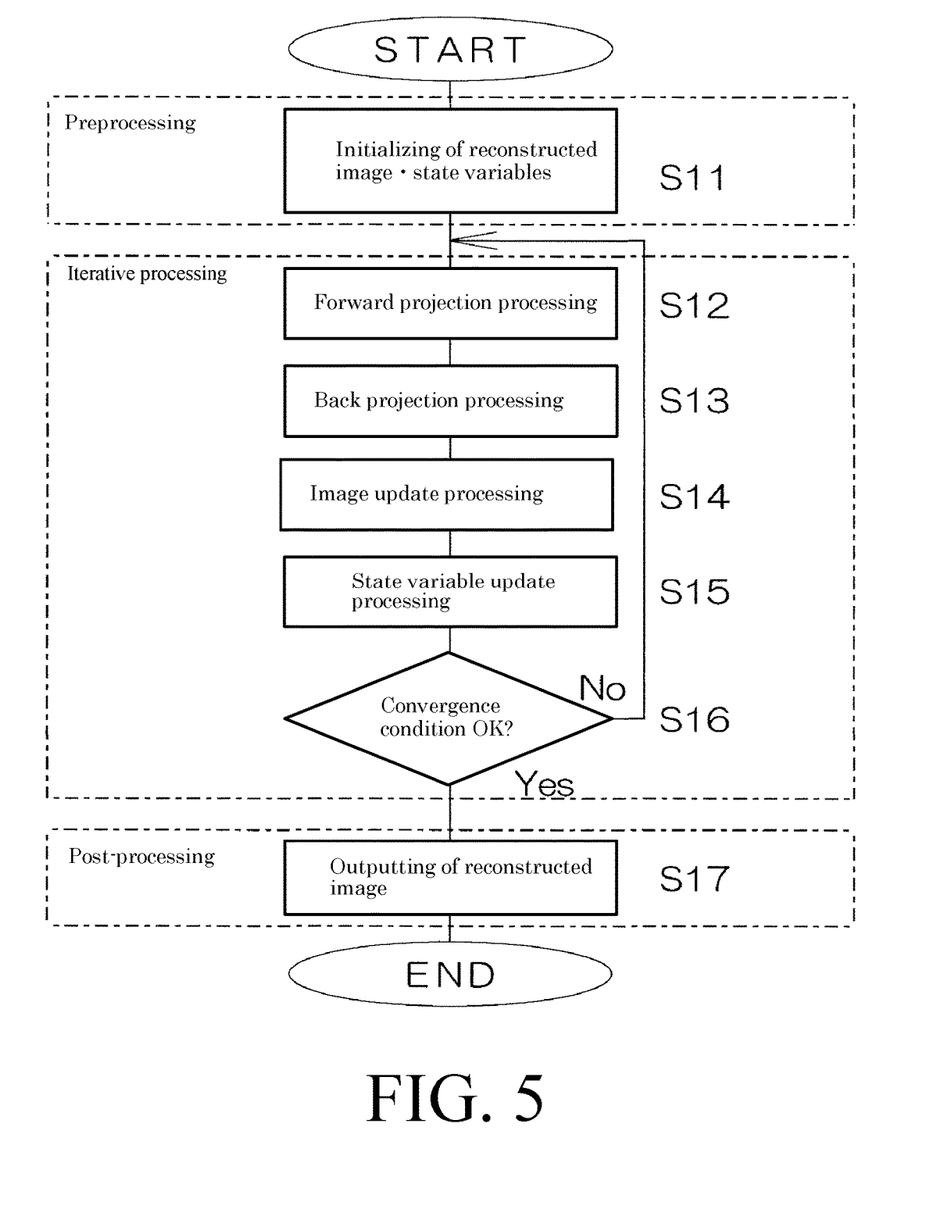
FIG. 5 is a flowchart showing processing for reconstructing an image with an iterative image reconstruction method.

FIG. 5 is a flowchart showing processing for reconstructing an image by an iterative image reconstruction method using such state variables.

When reconstructing an image by an iterative image reconstruction method, initially, preprocessing is performed. In this preprocessing, the reconstructed image $\mu^0$ and the state variables $\alpha^0$, $\beta^0$, and $R^0$ are initialized (Step S11). At this time, as the initial image, for example, a blank image (image in which all pixel values are zero) may be used.

Next, iterative processing is performed. This iterative processing is a processing step that iteratively performs the calculation represented by the aforementioned Formula (4). At this time, firstly, forward projection processing is performed (Step S12). Next, back projection processing is performed (Step S13). Then, after performing image update processing (Step S14), update processing of state variables is performed (Step S15). At this time, the second term in Formula (4) is calculated by the forward projection processing and the backprojection processing, the third term is calculated by the image update processing, and addition calculations of the entire right side are performed. Then, $\alpha''$, $\beta''$, and $R''$ are updated. This iterative processing is repeated until the convergence condition is satisfied (Step S16).

Thereafter, post-processing is performed. At the time of this post-processing, the reconstructed image after convergence condition is satisfied is output (Step S17).

The following documents are incorporated by reference in their entirety:

Patent Document 1: Japanese Patent Application Publication No. 2011-156302
Patent Document 2: U.S. Pat. No. 8,958,660
Non-Patent Document 1: C. Lemmens: Suppression of Metal Artifacts in CT Reconstruction Procedure That Combines MAP and Projection Completion IEEE Transactions on Medical Imaging, Volume: 28 Issue: 2 (2009)
Non-Patent Document 2: E. Tanaka: Subset-dependent relaxation in brock-iterative algorithms for image reconstruction in emission tomography, Phys Med Biol 48: 1405-1422 (2003)

SUMMARY

In the case of reconstructing an image using the iterative method, it requires more processing time as compared with a conventional filtered backcorrection method. In the case of reconstructing an image using an iterative method, at the time when a preset predetermined stopping criterion is satisfied, or at the time when the operator confirms the image which is being reconstructed and judges that necessary image quality is obtained, the iterative calculation is completed, and a reconstructed image is output. Here, there are many cases that the stopping criterion for the iterative calculation is set empirically in consideration of the processing time and the image quality, but there is no guarantee that the iterative calculation has converged and the necessary image quality has been obtained at that point. For this reason, in some cases, after completion of the calculation for reconstruction, the image quality of the reconstructed image is considered to be insufficient and therefore recalculation is required. In particular, it is considered that such recalculation is often required in industrial CT apparatus and the like having various image targets.

When performing such recalculation, in cases where $\alpha$ and $\beta$ do not depend on the number of iterations and the pixel position and R does not depend on the number of iterations as shown in the aforementioned Formula (3), that is, in cases where no state variables depend on the number of iterations or the like are used, the reconstructed image finally output is read and set as an initial value, and then the image is reconstructed again using the iterative method.

On the other hand, as shown in the aforementioned Formula (4), in cases where state variables which depend on the number of iterations or the like are used, the state variables have been discarded at the time of the recalculation. Therefore, it is necessary to restart the image reconstruction using the iterative method from the beginning.

For example, even in cases where it is desired to perform reconstruction of an image in which the number of iterations is 200 times on the basis of a judgement that image quality of a reconstructed image was insufficient after obtaining an image in which the number of iterations was 100 times in the first image reconstruction processing, it is required to perform recalculation from the $1^{st}$ time of the number of iterations. Assuming that the probabilistic element is not included in the reconstruction processing, the calculation result from the $1^{st}$ time to the $100^{th}$ time in the repetitive image reconstruction processing is the same as the calculation result of the initial image reconstruction processing, which indicates that useless calculation is performed.

Certain disclosed embodiments address one or more of such problems and provide an iterative image reconstruction method, an iterative image reconstruction program, and a tomography apparatus capable of efficiently performing image reconstruction by shortening computation time even in the case of resuming the image reconstruction when performing the image reconstruction using an iterative method.

Certain of the disclosed examples are directed to an iterative image reconstruction method of reconstructing an image using an iterative method characterized in that image reconstruction is performed with an iterative method using state variables which depend on the number of iterations or the pixel position to determine update conditions for obtaining a reconstructed image, the state variables are stored at the end of the image reconstruction, and image reconstruction is performed after reading the stored state variables when resuming the image reconstruction.

In some examples, an image is reconstructed with the iterative method using a plurality of state variables, and all or a part of the plurality of state variables are stored.

In some examples, a steepest descent method or a Newton's method is used as an optimization algorithm for the image reconstruction, and the plurality of state variables includes a data term and a penalty term.

Some examples are directed to an iterative image reconstruction program for making a computer perform the iterative image reconstruction method as described herein.

In some examples, a tomography apparatus equipped with computing means for performing the iterative image reconstruction program as described herein.

In some examples, when an image is reconstructed using an iterative method, it becomes possible to efficiently perform the image reconstruction by shortening the computation time even in the case of resuming the image reconstruction.

In some examples, it becomes possible to adjust the data amount of the state variables to be stored to an appropriate amount according to the image quality of the reconstructed image.

EMBODIMENT FOR CARRYING OUT THE INVENTION

Hereinafter, embodiments of the present invention will be described with reference to the attached drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 1:
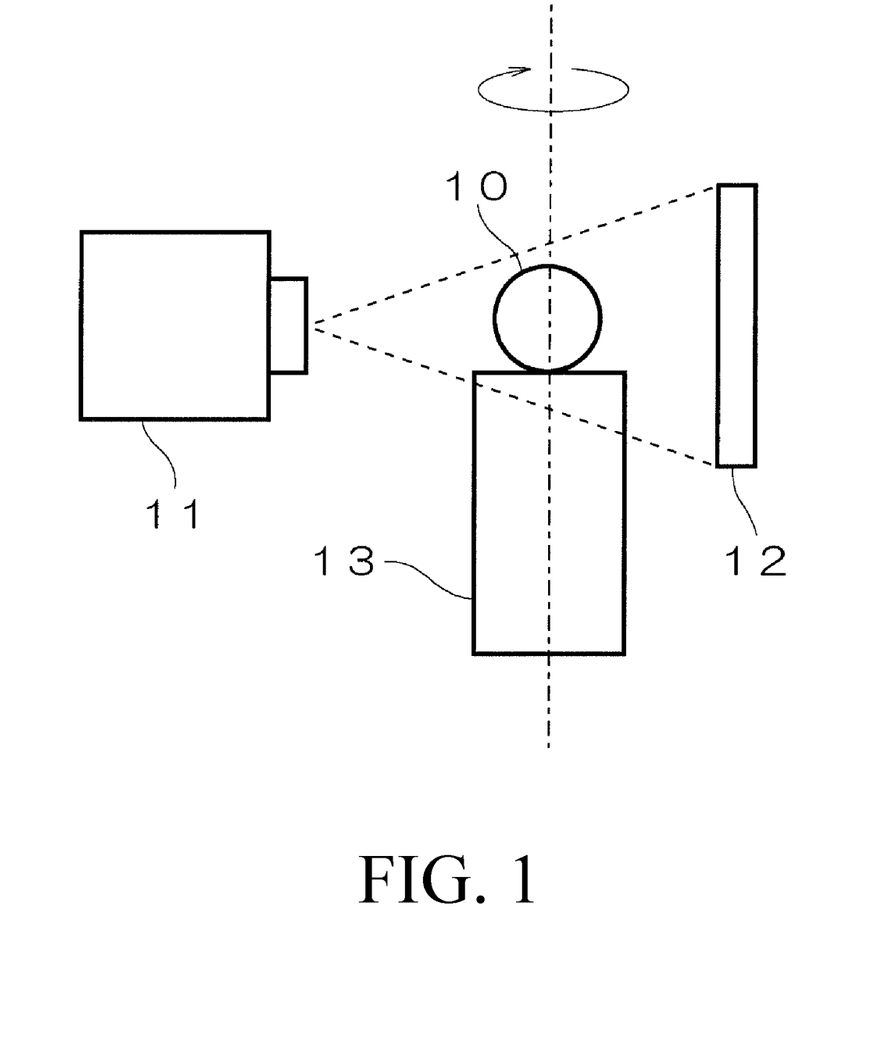
FIG. 1 is a schematic diagram of a tomography apparatus to which an iterative image reconstruction method according to the present invention is applied.

The embodiments are described, and illustrated in the drawings, in terms of functional blocks, units and/or modules. These blocks, units and/or modules may be physically implemented by electronic (or optical) circuits such as logic circuits, discrete components, microprocessors, hard-wired circuits, memory elements, wiring connections, and the like, which may be formed together in a single integrated circuit (e.g., as a single semiconductor chip) or as separate integrated circuits and/or discrete components (e.g., several semiconductor chips wired together on a printed circuit board) using semiconductor fabrication techniques and/or other manufacturing technologies. These blocks, units and/or modules may be implemented by a processor (e.g., a microprocessor, a controller, a CPU, a GPU) or processors that are programmed using software (e.g., microcode) to perform various functions discussed herein. Each block, unit and/or module may be implemented by dedicated hardware, or as a combination of dedicated hardware to perform some functions and a processor to perform other functions. Also, each block, unit and/or module of the embodiments may be embodied by physically separate circuits and need not be formed as a single integrated circuit. FIG. 1 is a schematic diagram of a tomography apparatus to which an iterative image reconstruction method according to the present invention is applied.

This tomography apparatus is for performing X-ray CT imaging of an imaging target 10, and is equipped with a stage 13 configured to rotate about an axis oriented in the vertical direction with the imaging target 10 placed thereon, an X-ray tube 11 configured to irradiate an X-ray toward the imaging target 10 that rotates together with the stage 13, and a flat panel detector 12 configured to detect the X-ray irradiated from the X-ray tube 11 and transmitted through the imaging target 10. The flat panel detector 12 acquires X-ray projection data based on the detected X-ray. In place of the flat panel detector 12, other X-ray detectors such as an image intensifier (I. I.) may be used.

Figure 2:
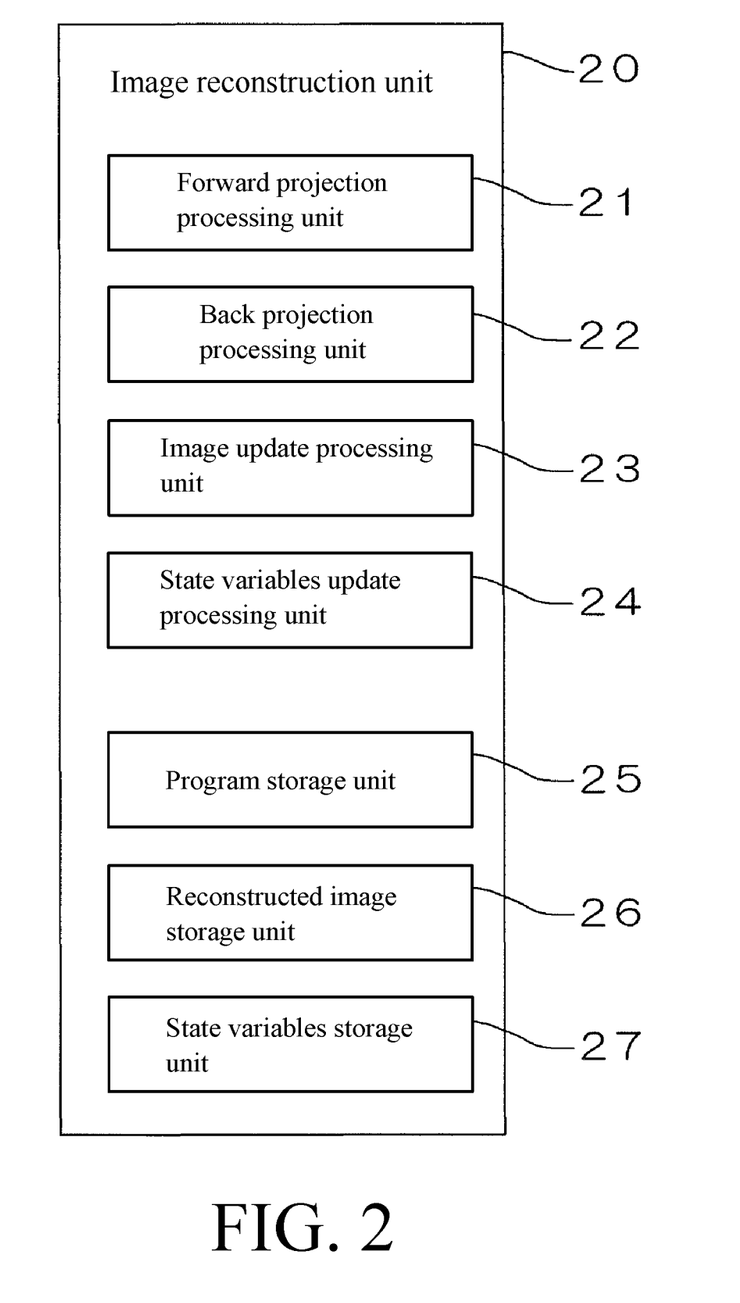
FIG. 2 is a functional block diagram of an image reconstruction unit 20.

FIG. 2 is a functional block diagram of an image reconstruction unit 20 for reconstructing an image with an iterative method based on the projection data of the X-ray acquired by the flat panel detector 12.

The image reconstruction unit 20 is composed of a computer including a CPU as a processor for performing a logical operation, a ROM for storing an operation program necessary for controlling an apparatus, and a RAM for temporarily storing data or the like at the time of control, and constitutes a part of a control unit for controlling the entire apparatus.

The image reconstruction unit 20 includes a forward projection processing unit 21 for performing forward projection processing, a backprojection processing unit 22 for performing back projection processing, an image update processing unit 23 for performing image update processing, and a state variable update processing unit 24 for performing update processing of the state variables. The image reconstruction unit 20 further includes a program storage unit 25 for storing an iterative image reconstruction program for making a computer perform the iterative image reconstruction method according to the present invention, a reconstructed image storage unit 26 for storing reconstructed images to be sequentially created, and a state variable storage unit 27 for storing state variables to be sequentially created. This image reconstruction unit 20 is connected to the flat panel detector 12 shown in FIG. 1.

Figure 3:
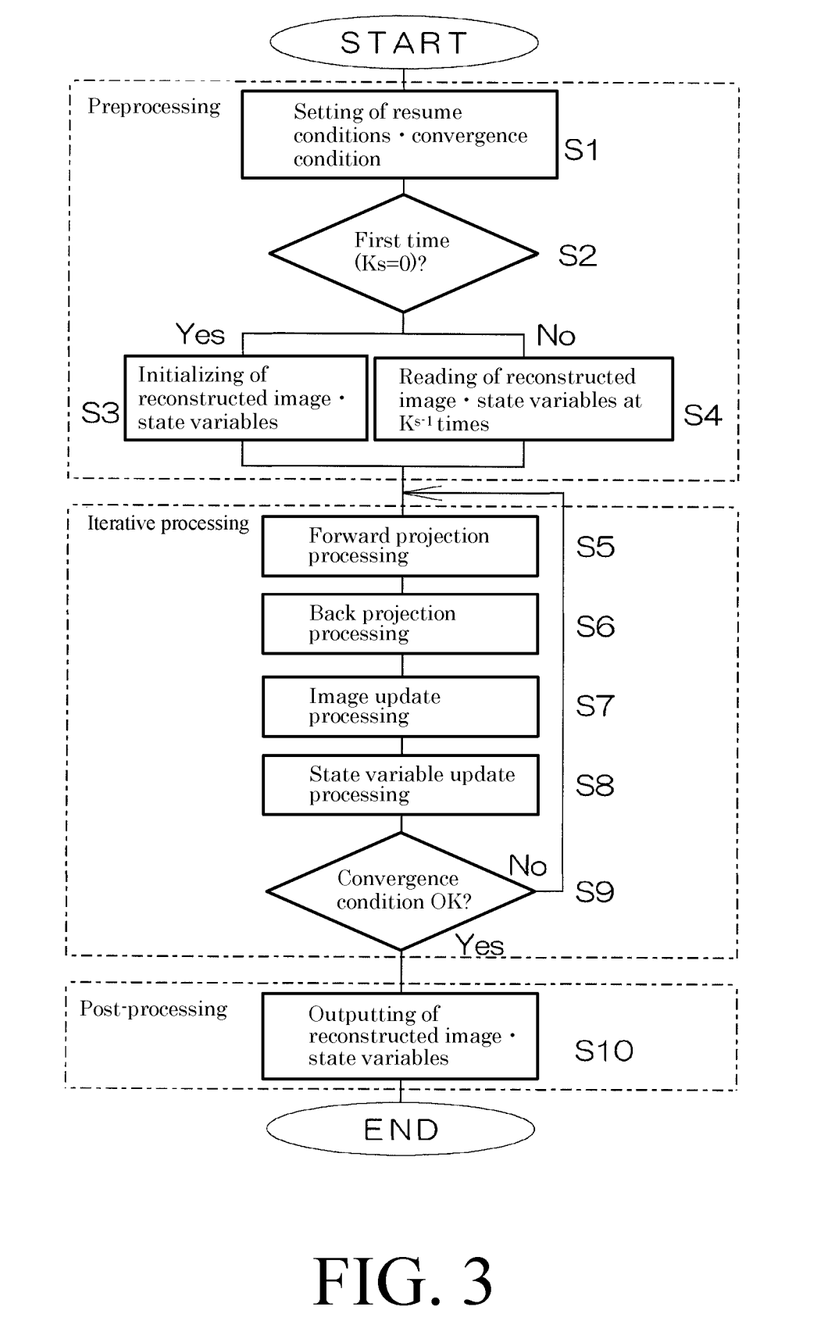
FIG. 3 is a flowchart showing processing for reconstructing an image with an iterative image reconstruction method according to the present invention.
Figure 4:
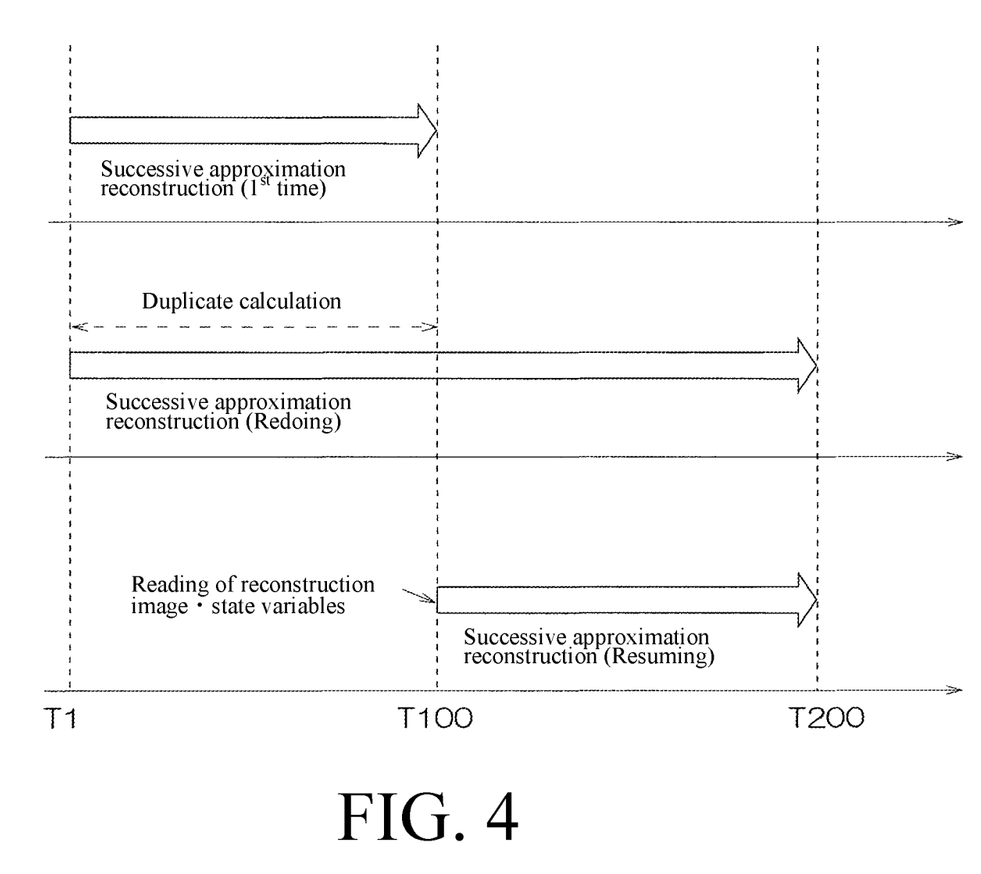
FIG. 4 is a conceptual diagram showing a basic idea of the iterative image reconstruction method according to the present invention.

Next, the image reconstruction operation by the iterative image reconstruction method according to the present invention will be described. FIG. 3 is a flowchart showing the processing of reconstructing an image by the iterative image reconstruction method according to the present invention. FIG. 4 is a conceptual diagram showing a basic idea of the iterative image reconstruction method according to the present invention. Note that in this embodiment, a steepest descent method is used as the optimization algorithm for image reconstruction and the aforementioned Formula (4) is applied. Instead of using the steepest descent method, a Newton's method may be used.

In the case of reconstructing an image using an iterative method, as shown in FIG. 4, there are some cases in which the image quality of the reconstructed image is insufficient when an image is obtained in which the number of iterations in the first image reconstruction processing is 100 times. In such a case, for example, in order to obtain an image in which the number of iterations is 200 times, it is required to perform the recalculation from the $1^{st}$ time of the number of iterations. At this time, assuming that no probabilistic element is included in the reconstruction processing, it is required for the calculation results from the $1^{st}$ time to the $100^{th}$ time in the image reconstruction processing to be performed again to perform a duplicate calculation similar to the calculation of the first image reconstruction processing. This means that unnecessary calculations are performed.

In contrast, in the iterative image reconstruction method according to the present invention, a configuration is adopted in which, in cases where the image quality after reconstruction is insufficient when the image was obtained with the number of iterations of 100 times in the first image reconstruction processing, when resuming the image reconstruction, the reconstructed image and the state variables at the end of the reconstruction in which the number of iterations is 100 times are read, and then the image reconstruction is resumed.

That is, as shown in FIG. 3, when reconstructing an image by using the iterative image reconstruction method according to the present invention, initially, preprocessing is performed. In this preprocessing, initially, sequential approximation number of iterations Ks is set as a resume condition, and an ending number Ke is set as a convergence condition (Step S1). The resume condition is uniquely determined by designating the image which was reconstructed. As the convergence condition, for example, it is also possible to set the value of the objective function.

Then, a reconstructed image and state variables are set. At this time, it is judged whether or not the reconstruction processing is the first time (Step S2). Then, when the reconstruction processing is the first time, that is, when Ks=0, the reconstructed image $\mu^0$ and the state variables $\alpha^0$, $\beta^0$, $R^0$ are initialized in the same manner as in the preprocessing shown in FIG. 5 (Step S3). At this time, as the initial image, for example, a blank image (image in which all pixel values are zero) may be used.

On the other hand, when the reconstruction processing is not the first time, that is, when Ks is not 0 and the reconstruction processing is resumed, the reconstructed image $\mu^{Ks-1}$ at the Ks$-1^{th}$ time is read from the reconstructed image storage unit 26 shown in FIG. 2 and the state variables $\alpha^{Ks-1}$, $\beta^{Ks-1}$, $R^{Ks-1}$ at the Ks$-1^{th}$ time are read from the state variable storage unit 27 shown in FIG. 2.

Thereafter, iterative processing is performed. At this time, in the same manner as in the case of iterative processing shown in FIG. 5, the calculation represented by Formula (4) is repeatedly performed. That is, initially, forward projection processing is performed (Step S5), and then back projection processing is performed (Step S6). After performing the image update processing (Step S7), the update processing of state variables is performed (Step S8). At this time, the second term in Formula (4) is calculated by forward projection processing and back projection processing, calculation of the third term is performed by image update processing, and addition calculation of the entire right side is performed. Then, the state variables $\alpha''$, $\beta''$, $R''$ are updated. This iterative processing is repeated until the convergence condition is satisfied, that is, until the number of iterations Ks reaches the termination number Ke (Step S9).

Thereafter, post-processing is performed. At this post-processing, the reconstructed image and the state variables after the convergence condition is satisfied are output (Step S10). That is, the reconstructed image $\mu^{Ke}$ after the iterative processing is output and stored in the reconstructed image storage unit 26 shown in FIG. 2. Also, the state variables $\alpha^{Ke}$, $\beta^{Ke}$, $R^{Ke}$ updated after the iterative processing are output and stored in the state variable storage unit 27 shown in FIG. 2.

As described above, in the iterative image reconstruction method according to the present invention, a configuration is adopted in which, when resuming the image reconstruction, the image reconstruction is resumed after reading the reconstructed image and the state variables at the end of the last reconstruction. Therefore, when an image is reconstructed using the iterative method, it becomes possible to efficiently perform the reconstruction by shortening the computation time even in cases where the image reconstruction is resumed.

In the aforementioned embodiment, the state variables to be stored in the state variable storage unit 27 shown in FIG. 2 may be not all of $\alpha^{Ke}$, $\beta^{Ke}$, $R^{Ke}$, but may be a part of $\alpha^{Ke}$, $\beta^{Ke}$, and $R^{Ke}$. In the case of adopting such an embodiment, it is possible to adjust the data amount of the state variables that needs to be stored in the state variable storage unit 27 to an appropriate amount according to the image quality of the reconstructed image.

In the aforementioned embodiment, the reconstruction conditions are the same in the case of initially performing the reconstruction processing and the case of resuming the reconstruction processing. However, for example, reconstruction may be performed at a low resolution when the reconstruction processing is initially performed, and reconstruction at a high resolution may be performed when the reconstruction processing is resumed. Also, the reconstructed image stored in the reconstructed image storage unit 26 and/or a part of the state variables stored in the state variable storage unit 27 may be changed or created by another method.

In the aforementioned embodiment, the case in which the steepest descent method is adopted as the optimization algorithm was described. However, as described above, a Newton's method may be used in place of the steepest descent method, and furthermore, other optimization algorithms may be used. Further, in the aforementioned embodiment, the case in which $\alpha''$, $\beta''$, $R''$ are used as the state variables was described, but variables other than $\alpha''$, $\beta''$, $R''$ may be used as the state variables.

Furthermore, in the aforementioned embodiment, the case in which the iterative image reconstruction method according to the present invention is applied to the tomography apparatus for performing X-ray CT imaging of the imaging target 10. However, the iterative image reconstruction method according to the present invention may be applied to a medical X-ray CT apparatus, a medical tomosynthesis imaging apparatus or the like.

DESCRIPTION OF REFERENCE SYMBOLS

10: imaging target
11: X-ray tube
12: flat panel detector
13: rotary stage
20: image reconstruction unit
21: forward projection processing unit
22: back projection processing unit
23: image update processing unit
24: state variable update processing unit
25: program storage unit
26: reconstructed image storage unit
27: state variable storage unit

The invention claimed is:

1. An iterative image reconstruction method of reconstructing an image using an iterative method, comprising:
    performing first image reconstruction with the iterative method using first state variables to obtain a first reconstructed image;
    storing the first state variables and the first reconstructed image at an end of the first image reconstruction;
    judging whether or not to initialize the first state variables and the first reconstructed image before performing second image reconstruction:
    reading the first state variables and the first reconstructed image when it is judged not to initialize the first state variables and the first reconstructed image; and
    performing the second image reconstruction using second state variables and the first reconstructed image to obtain a second reconstructed image,
    wherein the first state variables depend on the number of iterations or a pixel position to determine update conditions for obtaining the first reconstructed image, and
    wherein the second state variables include at least a portion of the first state variables.

2. The iterative image reconstruction method as recited in claim 1,
    wherein the second state variables include third state variables different from the first state variables.

3. The iterative image reconstruction method as recited in claim 2, wherein a steepest descent method or a Newton's method is used as an optimization algorithm for the first and second image reconstructions, and wherein the first state variables include a data term and a penalty term.

4. A non-transitory computer-readable storage medium storing instructions for performing iterative image reconstruction using a computer, the instructions causing one or more computer processors to perform operations according to a method comprising:

performing first image reconstruction with an iterative method using first state variables to obtain a first reconstructed image;

storing the first state variables and the first reconstructed image at an end of the first image reconstruction;

judging whether or not to initialize the first state variables and the first reconstructed image before performing second image reconstruction:

reading the first state variables and the first reconstructed image when it is judged not to initialize the first state variables and the first reconstructed image; and performing the second image reconstruction using second state variables and the first reconstructed image to obtain a second reconstructed image, wherein the first state variables depend on the number of iterations or a pixel position to determine update conditions for obtaining the first reconstructed image, and wherein the second state variables include at least a portion of the first state variables.

5. A tomography apparatus for performing iterative image reconstruction comprising:

at least one storage device storing instructions; and at least one computer processor configured to execute the instructions and to cause the apparatus to perform operations comprising:

performing first image reconstruction with an iterative method using first state variables to obtain a first reconstructed image;

storing the first state variables and the first reconstructed image at an end of the first image reconstruction;

judging whether or not to initialize the first state variables and the first reconstructed image before performing second image reconstruction:

reading the first state variables and the first reconstructed image when it is judged not to initialize the first state variables and the first reconstructed image; and performing the second image reconstruction using second state variables and the first reconstructed image to obtain a second reconstructed image, wherein the first state variables depend on the number of iterations or a pixel position to determine update conditions for obtaining the first reconstructed image, and wherein the second state variables include at least a portion of the first state variables.

6. An iterative image reconstruction method of reconstructing an image using an iterative method, comprising:

performing first image reconstruction with the iterative method using first state variables to obtain a first reconstructed image;

storing the first state variables and the first reconstructed image at an end of the first image reconstruction;

reading the first state variables and the first reconstructed image; and performing second image reconstruction using second state variables and the first reconstructed image to obtain a second reconstructed image, wherein the first state variables depend on the number of iterations or a pixel position to determine update conditions for obtaining the first reconstructed image, wherein the second state variables include at least a portion of the first state variables, wherein the second state variables include third state variables different from the first state variables, wherein a steepest descent method or a Newton's method is used as an optimization algorithm for the first and second image reconstructions, and wherein the first state variables include a data term and a penalty term.

* * * * *